(12) United States Patent
Scott

(10) Patent No.: US 8,171,402 B2
(45) Date of Patent: May 1, 2012

(54) HANDHELD ELECTRONIC DEVICE INCLUDING AUTO COMPLETION OF PUNCTUATION IN NUMERICAL ENTRY, AND ASSOCIATED METHOD

(75) Inventor: Sherryl Lee Lorraine Scott, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 1052 days.

(21) Appl. No.: 11/558,622

(22) Filed: Nov. 10, 2006

(65) Prior Publication Data
US 2008/0115054 A1  May 15, 2008

(51) Int. Cl.
*G06N 3/00* (2006.01)
(52) U.S. Cl. ......................................................... 715/261
(58) Field of Classification Search .................. 715/255, 715/256, 261, 264; 345/169; 341/22–23; 455/566
See application file for complete search history.

(56) References Cited

U.S. PATENT DOCUMENTS

| | | | |
|---|---|---|---|
| 4,567,567 A | | 1/1986 | Lapeyre |
| 4,682,288 A * | | 7/1987 | Taipale et al. ................... 705/16 |
| 5,657,259 A * | | 8/1997 | Davis et al. ................... 708/204 |
| 5,850,629 A * | | 12/1998 | Holm et al. ................... 704/260 |
| 6,073,090 A * | | 6/2000 | Fortune et al. ..................... 704/8 |
| 6,204,848 B1 * | | 3/2001 | Nowlan et al. ................. 715/810 |
| 6,377,965 B1 * | | 4/2002 | Hachamovitch et al. ..... 715/203 |
| 6,957,385 B2 * | | 10/2005 | Chan et al. ..................... 715/220 |
| 7,679,606 B2 * | | 3/2010 | Scott ............................. 345/168 |
| 7,742,048 B1 * | | 6/2010 | Moore et al. .................. 345/467 |
| 2002/0116172 A1 * | | 8/2002 | Vargas .............................. 704/8 |
| 2004/0068691 A1 * | | 4/2004 | Asbury .......................... 715/500 |
| 2005/0273332 A1 * | | 12/2005 | Scott et al. ..................... 704/247 |
| 2007/0038617 A1 * | | 2/2007 | Feinberg et al. ................... 707/4 |
| 2007/0225046 A1 * | | 9/2007 | Scott ............................. 455/564 |

FOREIGN PATENT DOCUMENTS

WO  03/021937 A1  3/2003

OTHER PUBLICATIONS

Hopwood, David, "[idn] Comments on IDNA-04", Retrieved from the Internet at http://www.imc.org/idn/mail-archive/msg04890.html.

* cited by examiner

*Primary Examiner* — Kyle Stork
(74) *Attorney, Agent, or Firm* — Finnegan, Henderson, Farabow, Garrett & Dunner, LLP

(57) ABSTRACT

A handheld electronic device has the capability to automatically output a preferred punctuation arrangement in response to determining whether a previous output has a predetermined characteristic. An alphanumeric input is detected as a first number of input member actuations. Responsive to the detecting an alphanumeric input, a first output is generated. A second number of input member actuations are detected as a punctuation input. A determination is made that the first output comprises a digit. Responsive to the determination, a preferred punctuation arrangement is identified. In certain examples, a selectable geographic location of use and an actual geographic location of use are detected and a comma is identified as the preferred punctuation arrangement.

19 Claims, 6 Drawing Sheets

HANDHELD ELECTRONIC DEVICE INCLUDING AUTO COMPLETION OF PUNCTUATION IN NUMERICAL ENTRY, AND ASSOCIATED METHOD

BACKGROUND

1. Field

The disclosed and claimed concept relates generally to handheld electronic devices and, more particularly, to a method of enabling input on a handheld electronic device.

2. Description of the Related Art

Numerous types of handheld electronic devices are known. Examples of such handheld devices include, for instance, personal data assistants (PDAs), handheld computers, two-way pagers, cellular telephones, and the like. Many handheld electronic devices also feature wireless communication capability, although many such handheld devices are stand-alone devices that are functional without communication with other devices.

Users of handheld electronic devices can often find themselves entering a large amount of data, such as numerical data, into their handheld electronic devices. In order to ease the load on the user and to increase the amount of data that the user can enter into the handheld electronic device, some handheld electronic devices (hereinafter, referred to as traditional handheld electronic devices) allow the user to enter a punctuation, such as a period, simply by actuating a single input member, such as the <SPACE> key, a number of times. For example, the handheld electronic device can be programmed to output a period upon detecting two successive actuations (i.e., a double actuation) of the <SPACE> key. In some instances, however, the output that is generated in response to the double actuation of the <SPACE> key actually increases the load on the user because the user may have to take corrective measures prior to entering more data into the handheld electronic device. Therefore, it would be desirable to overcome this shortcoming in an efficient fashion that makes the handheld electronic device easier to use.

BRIEF DESCRIPTION OF THE DRAWINGS

A full understanding of the disclosed and claimed concept can be gained from the following description when read in conjunction with the accompanying drawings in which:

DESCRIPTION

Figure 1:
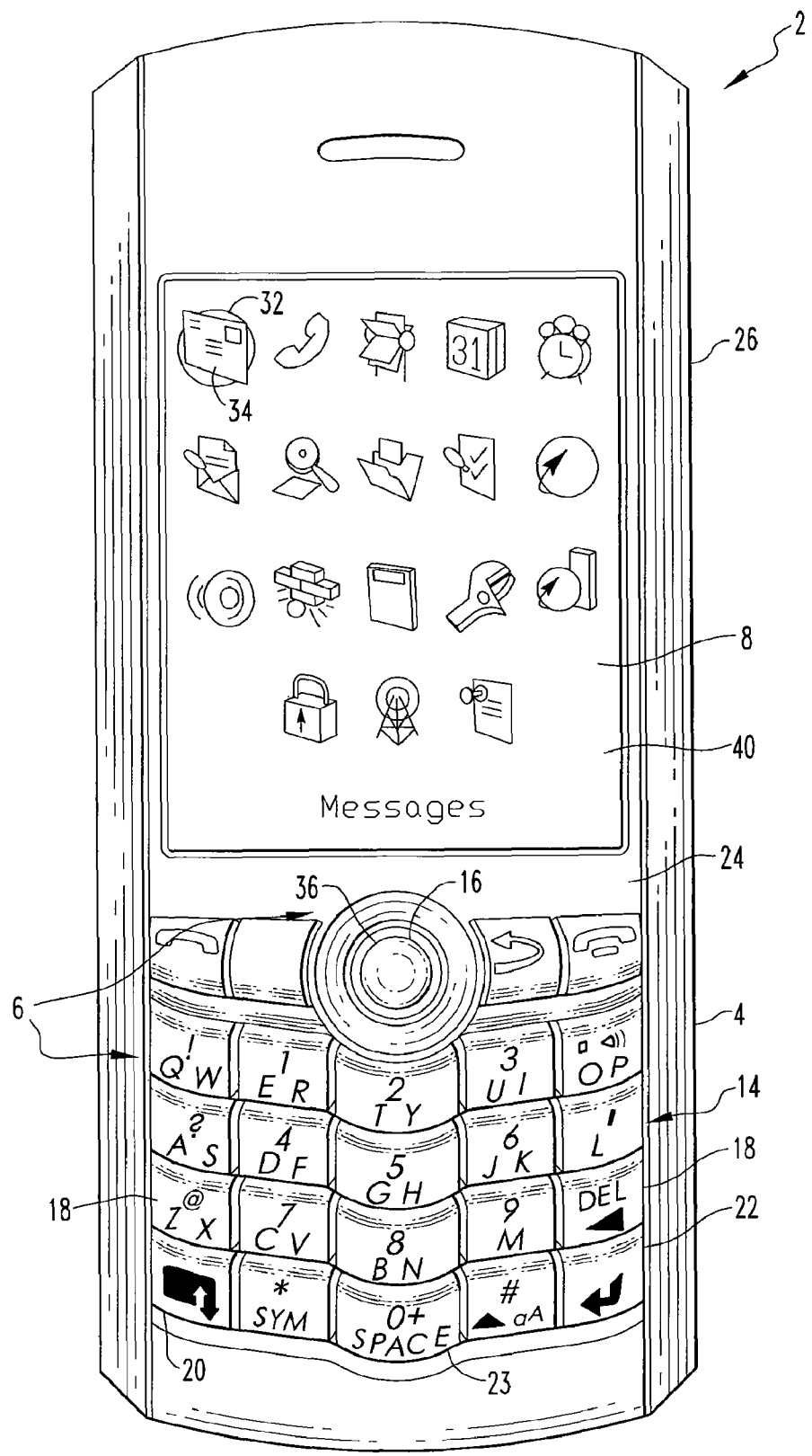
FIG. 1 is a top plan view of an embodiment of an improved handheld electronic device in accordance with the disclosed and claimed concept.

As used herein, the phrase "a number of" or variations thereof means one or an integer greater than one.

As used herein, the phrase "digit" or variations thereof shall include, without limitation, 1, 2, 3, 4, 5, 6, 7, 8, 9, 0, and combinations thereof.

As used herein, the phrase "alphanumeric" or variations thereof shall broadly refer to a letter, such as a Latin letter, and/or a digit.

As used herein, the phrase "currency symbol" or variations thereof shall broadly refer to a symbol that denotes a monetary value such as, without limitation, $, €, ₣, and other such symbols.

As used herein, the phrase "European" shall refer broadly to a location on or near the European continent that, in a numerical context, utilizes a comma as a decimal symbol in place of a period. For example, the country implements the convention wherein 1.00 is written as 1,00 (i.e., the comma replaces the decimal point).

As used herein, the phrase "actual geographic location of use" or variations thereof shall broadly refer to the current geographic location that the handheld electronic device 2 is currently disposed in. The geographic location of the handheld electronic device can be determined by a variety of ways including, but not limited to, triangulation using a number of cellular towers to which the handheld electronic device is electronically connected to or through a Global Positioning System (GPS).

As used herein, the phrase "selected geographic location of use" or variations thereof shall broadly refer to a geographic location of the handheld electronic device as selected by the user of the handheld electronic device from among a plurality of selectable geographic locations. For example, the user could select that the handheld electronic device is in Spain despite the fact that the actual geographic location of the handheld electronic device is in Germany.

As used herein, the phrase "operative language" or variations thereof shall broadly refer to the language that the handheld electronic device is currently operating in.

As used herein, the phrase "non-English language convention" shall refer broadly to a language that, in a numerical context, utilizes a comma as a decimal symbol in place of a period. For example, the country's language implements the convention wherein 1.00 is written as 1,00 (i.e., the comma replaces the decimal point).

Directional phrases used herein, such as, for example, upper, lower, left, right, vertical, horizontal, top, bottom, above, beneath, clockwise, counterclockwise and derivatives thereof, relate to the orientation of the elements shown in the drawings and are not limiting upon the claims unless expressly recited therein.

One embodiment of a handheld electronic device 2 is depicted generally in FIG. 1. The handheld electronic device of FIG. 1 is depicted schematically in FIG. 2. The handheld electronic device 2 includes a housing 4 upon which are disposed a processor unit that includes an input apparatus 6, an output apparatus 8, a processor 10, a memory 12, and a wireless transceiver 13. The processor 10 may be, for instance, and without limitation, a microprocessor (µP) and is responsive to inputs from the input apparatus 6 and provides output signals to the output apparatus 8. The processor 10 also interfaces with the memory 12 which, as will be discussed in greater detail below, contains one or more routines. The processor 10 and the memory 12 together form a processor apparatus.

Referring to FIG. 1, the input apparatus 6 includes a keypad 14 and a navigational input 16. The keypad 14 is in the exemplary form of a reduced QWERTY keyboard including a plurality of keys 18 that serve as input members. For instance, the keypad 14 includes an <ALT> key 20, an <ENTER> key 22, and a <SPACE> key 23. It is noted, however, that the keypad 14 may be of other configurations, such as an AZERTY keyboard, a QWERTY keyboard, a QWERTZ keyboard or another keyboard arrangement, whether presently known or unknown.

The keys 18 are located on a front face 24 of the housing 4, and the navigational input 16, which is a trackball 36, is disposed on the front face 24 of the housing 4. The trackball 36 is rotatable in various directions thereby allowing for the navigation of the cursor 32, which is displayed on the output apparatus 8, in various directions including up, down, left, right, and any combination thereof. Moreover, the trackball 36 can also be depressed to provide a selection or other input based upon the current location of the cursor 32. Accordingly, rotation of the trackball 36 can navigate the cursor 32 over a particular program icon 34, while depression of the trackball 36 can launch the program. It should be noted that a trackwheel (not shown), which can be disposed on a side 26 of the housing 4, can be used in lieu of the trackball 36. Similar to the trackball, the trackwheel can serve as input member since the trackwheel is capable of being rotated as well as being depressed. Rotation of the trackwheel can provide a navigation or other input, while depression of the trackwheel can provide a selection or other input. For example, if a cursor 32 is located over a given program icon 34, that program will be launched when the trackwheel is depressed.

Figure 2:
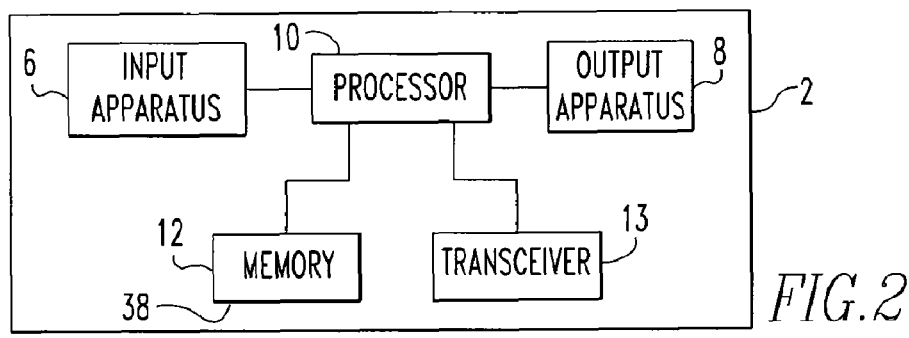
FIG. 2 is a schematic depiction of the handheld electronic device of FIG. 1.

Referring to FIG. 2, the memory 12 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. As can be seen from FIG. 2, the memory 12 is in electronic communication with the processor 10. The memory 12 additionally can include one or more routines depicted generally with the numeral 38 for the processing of data. The routines 38 can be in any of a variety of forms such as, without limitation, software, firmware, and the like.

Figure 3:
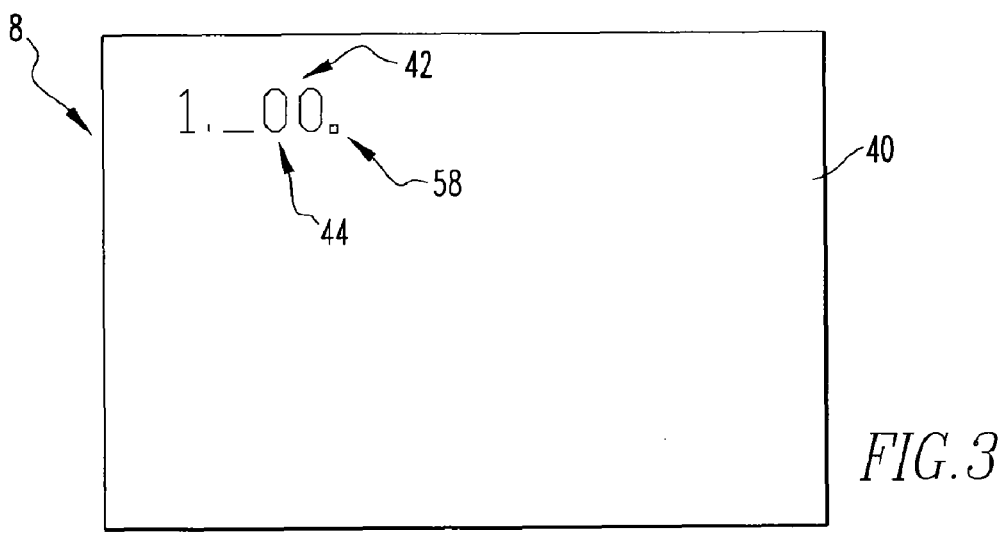
FIG. 3 depicts an output that can be generated on the improved handheld electronic device of FIG. 1.
Figure 4:
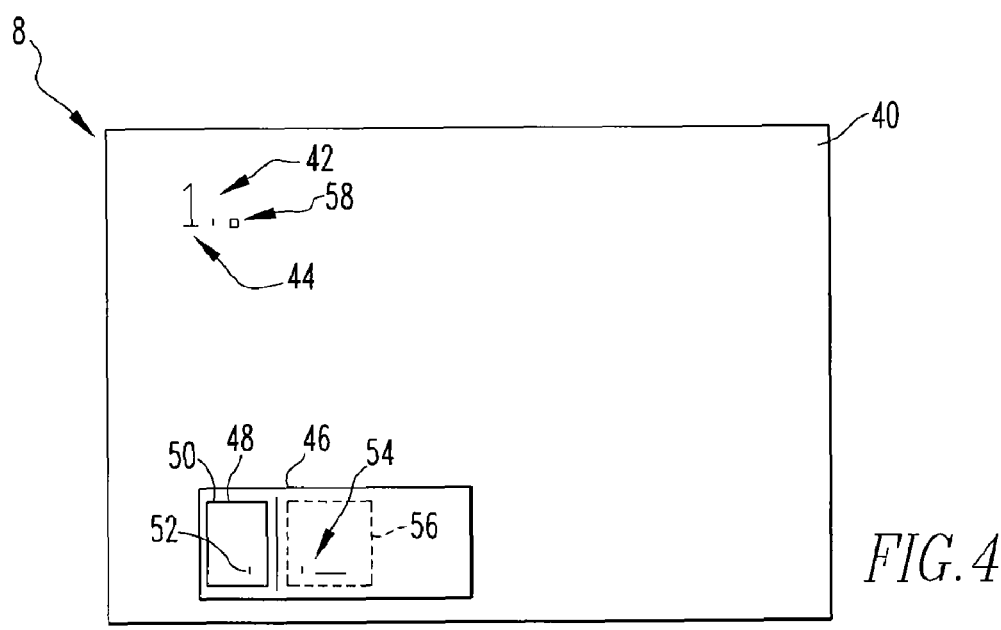
FIGS. 4, 4A, and 4B depict other outputs that can be generated on the improved handheld electronic device.
Figure 4A:
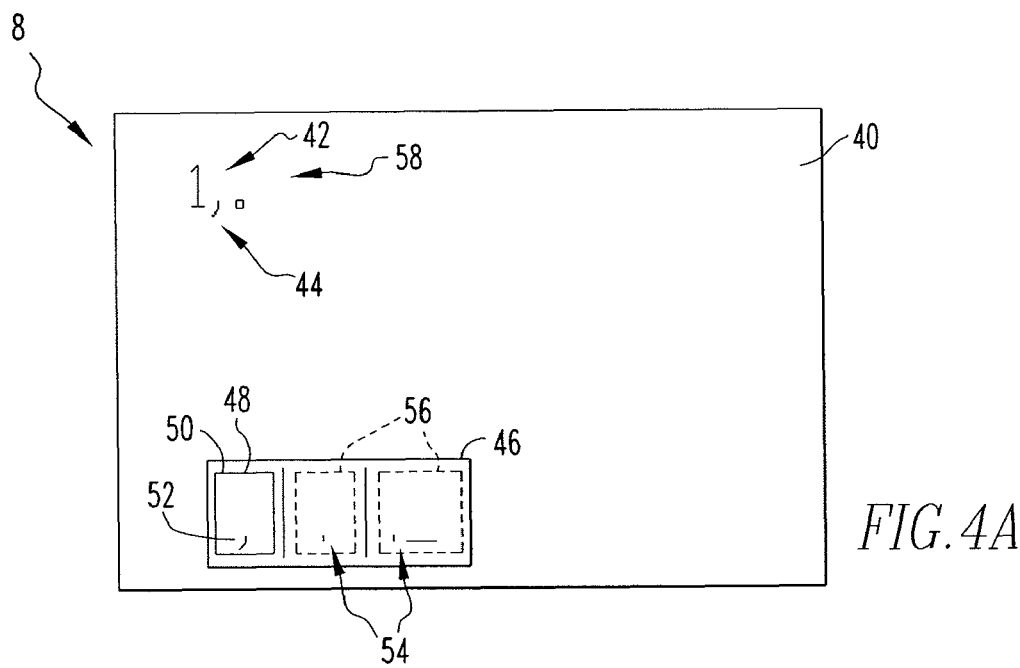
Figure 4B:
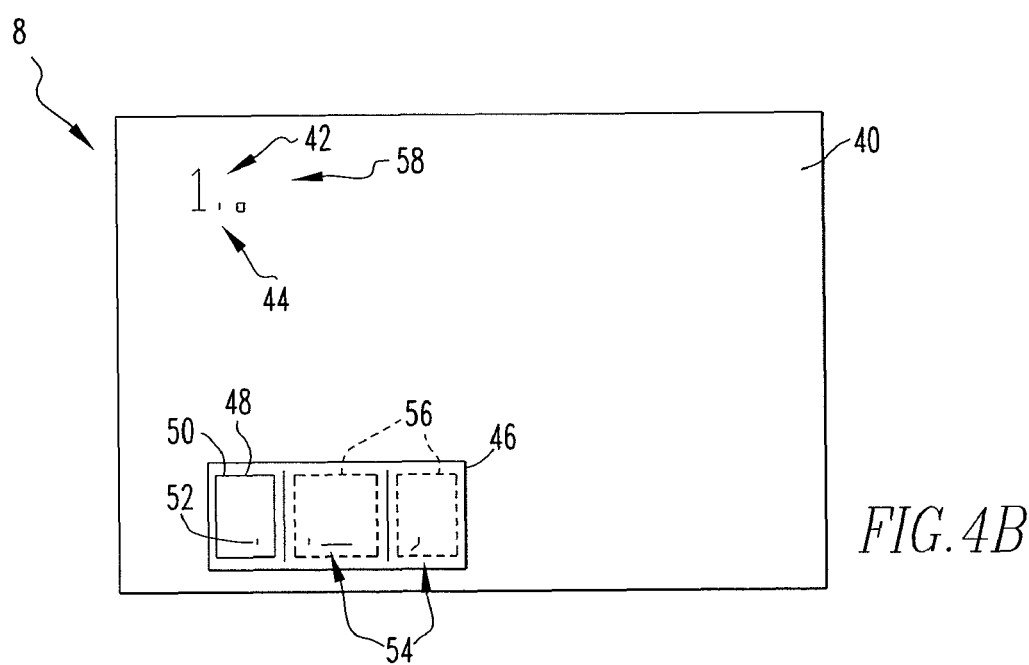

The output apparatus 8 includes a display 40 upon which can be provided an output 42. An exemplary output 42 is depicted on the display 40 in FIGS. 3, 4, 4A, and 4B. Referring to FIGS. 4, 4A, and 4B, the output 42 includes a text component 44 and a variant component 46 which extends substantially horizontally across the display 40. This, however, is not meant to be limiting since the variant component 46 can also extend across the display 40 substantially vertically or can be otherwise disposed. Preferably, the variant component 46 is located generally in the vicinity of the text component 44. The variant component 46 includes a predetermined quantity of selectable outputs from which the user can select. The variant component 46 includes a selection box 48 that appears in a default position 50. Initially, the default position 50 of the selection box 48 surrounds and/or highlights a preferred output 52 (hereinafter, referred to as the preferred punctuation arrangement) while the remainder of the variant component 46 displays various alternative outputs 54 (hereinafter, referred to as the alternative selectable punctuation arrangements). The selection box 48 is capable of being moved (i.e., shifted) from the default position 50 to a number of other positions 56 by depressing or actuating a number of keys 18 or by rotating the navigational input 16. By moving the selection box 48 to surround and/or highlight the alternative selectable punctuation arrangements 54, the user is able to select any one of the various selectable punctuation arrangements 54 for possible output on the output apparatus 8 of the handheld electronic device 2. The display 40 also includes a caret (cursor) 58 that depicts generally where the next output will be displayed.

As stated above, traditional handheld electronic devices include features that allow the user to enter a punctuation, such as a period, when the traditional handheld electronic device detects multiple actuations of a single input member. The period that is generated as a result of the multiple actuations, however, may also be followed by a space. While this is beneficial when a user is entering a number of sentences into the traditional handheld electronic device, this feature can be problematic if the user is attempting to enter a numeric value into the traditional handheld electronic device.

For example, if a user is attempting to enter 1.00 into the traditional handheld electronic device, the user would first input the digit "1" by actuating the input member that corresponds to the digit "1". After the "1" has been entered, the user would then enter the period by actuating the <SPACE> key 23 two times. However, as stated above, actuation of the <SPACE> key 23 twice will cause the traditional handheld electronic device to enter and generate (output) one or more spaces following the desired period. Referring to FIG. 3, if the user continued to enter the two remaining digits into the traditional handheld electronic device, the ultimate output would be 1._00 (underscore added for emphasis). Accordingly, in order to properly enter 1.00 the user would have to erase the space that was automatically entered after the period prior to entering the first "0" which decreases the user's ability to efficiently enter data into traditional handheld electronic device.

The disclosed concept enables the handheld electronic device 2 to overcome this shortcoming by having a routine 38 that is adapted in certain circumstances to prefer, as a preferred punctuation arrangement, a period (i.e., no space following the period) only upon detecting a double actuation of an input member, such as the <SPACE> key 23, which corresponds to the period. Specifically, the handheld electronic device 2 will prefer the preferred punctuation arrangement when the handheld electronic device 2 determines that the data that was generated (outputted) immediately prior to the double actuation of the <SPACE> key 23 has a predetermined characteristic.

Referring to FIGS. 1, 2, and 4, the routine 38 will determine whether data that was generated (hereinafter, referred to as the first output) immediately prior to the double actuation of the <SPACE> key 23 includes a digit. Referring to FIG. 4, if the handheld electronic device 2 does determine that the first output includes a digit, then the handheld electronic device 2 will prefer, as the preferred punctuation arrangement 52, a period with no additional spaces thereafter, thereby allowing the user of the handheld electronic device 2 to enter additional digits without having to take any corrective measures (i.e., erasing the space that would normally follow the period).

In addition to preferring the preferred punctuation arrangement 52, the handheld electronic device 2 can also generate a number of alternative selectable punctuation arrangements 54 on the output apparatus 8 of the handheld electronic device 2. Specifically, the preferred punctuation arrangement 52, as well as the alternative selectable punctuation arrangement(s) 54, will be displayed in the variant component 46 on the display 40. The selectable punctuation arrangements 54 can be selected and entered into the handheld electronic device 2 by actuation and/or depression of the navigational input 16 or, alternatively, by actuation of a number of keys 18. Referring to FIG. 4, in one embodiment the alternative selectable punctuation arrangement 54 is a period with a space thereafter. It should be noted that in FIGS. 4, 4A, and 4B, the space is represented by an underscore. If the alternative selectable punctuation arrangement 54 is selected by the user, then the selected punctuation arrangement 54 will be entered into the handheld electronic device 2 and output on the display 40 as a part of the text component 44 in lieu of the preferred punctuation arrangement 52. For example, continuing with FIG. 4, if the user would like to override the preferred punctuation arrangement 52, which is a period with no additional space thereafter, and enter the alternative selectable punctuation arrangement 54, which is a period with a space thereafter, then the user would navigate to the alternative selectable punctuation arrangement 54 and select it by utilizing the navigational input 16 and/or a number of keys 18. In response to the selection, the handheld electronic device 2 will then enter the alternative selectable punctuation arrangement 54.

Moreover, in certain circumstances the routine 38 is further adapted to prefer, as the preferred punctuation format 52, a comma, which is useful in situations where a comma is used as the decimal symbol in place of the period. For instance, in English the quantity one (1.00) can be written with a period between the "1" and the first "0" while in Spanish the quantity one (1,00) can be written with a comma between the "1" and the first "0". This capability is accomplished by having the routine 38, determine whether the selected or actual geographic location of use of the handheld electronic device 2 is European after detecting the double actuation of the <SPACE> key 23. Referring to FIG. 4A, if it is determined that the selected or actual geographic location of use is European and that the first output includes a digit, then the handheld electronic device 2, upon detecting the double actuation of the <SPACE> key 23, will prefer as the preferred punctuation format 52 a comma followed by no space while generating as the alternative selectable punctuation arrangements 54 a period followed by no space and a period followed by a space.

Alternatively, the routine 38 can also be adapted to determine whether the currently selected operative language on the handheld electronic device 2 is a non-English language convention and, responsive to the determination, the routine 38 will automatically output a comma as the preferred punctuation arrangement 52 upon detecting the double actuation of the <SPACE> key 23 as well as determining that the first output includes a digit.

In another embodiment, the routine 38 will prefer, as the preferred punctuation arrangement 52, a period or a comma with no space thereafter only if the routine 38 determines that an initial output comprises a currency symbol and that the first output comprises a digit.

Referring to FIG. 4B, in another embodiment, the handheld electronic device 2 can prefer, as the preferred punctuation arrangement 52, a period with no space thereafter while generating as the alternative selectable punctuation arrangements 54 the following: (1) a period with a space thereafter, and (2) a comma with no space thereafter. It should be noted, however, that in some instances the user might not want the handheld electronic device 2 to generate, as an alternative selectable punctuation arrangement 54, the comma with no space thereafter. Accordingly, the user could instruct the handheld electronic device 2 to only output, as the alternative selectable punctuation arrangement, the period with a space thereafter in response to the detecting the double actuation of the <SPACE> key 23.

Figure 5:
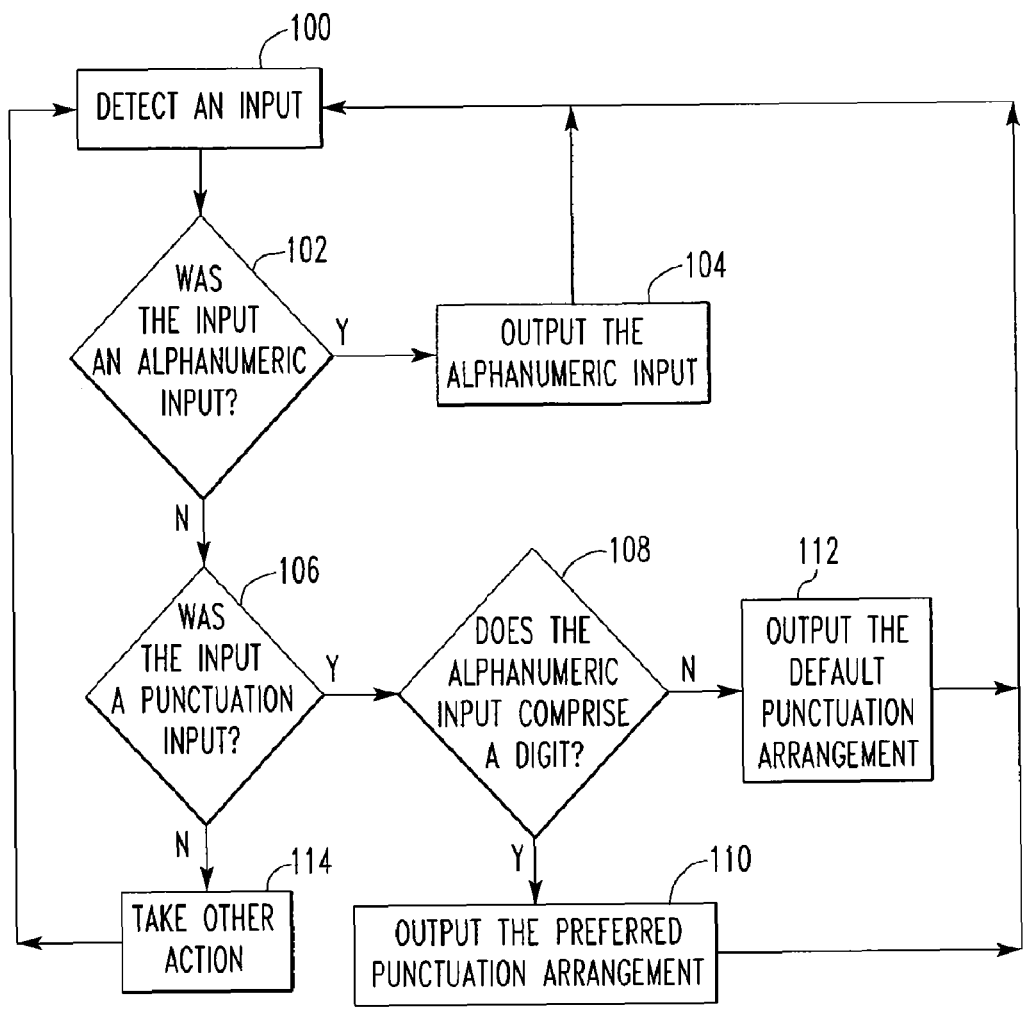
FIG. 5 is a flowchart depicting one embodiment of an improved method in accordance with the disclosed and claimed concept.

FIG. 5 is a flowchart depicting one embodiment of the disclosed concept. As can be seen from this figure, the handheld electronic device 2 will detect an input at step 100. The handheld electronic device 2 will then determine whether the detected input was an alphanumeric input at step 102. If the handheld electronic device 2 does determine that the detected input was an alphanumeric input, then the handheld electronic device 2 will output the alphanumeric input at step 104. After the handheld electronic device 2 has outputted the alphanumeric input, the handheld electronic device will return to step 100.

The handheld electronic device 2 can then detect another input at step 100. After detecting the input, the handheld electronic device will determine whether the detected input was an alphanumeric input at step 102. If the handheld electronic device 2 determines that the detected input was not an alphanumeric input, then the handheld electronic device will determine whether the detected input was a punctuation input at step 106. If the handheld electronic device 2 does determine that the detected input was a punctuation input, then the handheld electronic device 2 will determine whether the alphanumeric input comprised a digit at step 108. If the handheld electronic device 2 does determine that the alphanumeric input comprised a digit, then the handheld electronic device will output the preferred punctuation arrangement, which is a period followed by no space thereafter, at step 110. Otherwise, the handheld electronic device 2 will output the default punctuation arrangement, which is typically a period followed by a space, at step 112.

Alternatively, if the handheld electronic device 2 determines, at step 106, that the detected input was not a punctuation input, then the handheld electronic device 2 will take some other action including, but not limited to, determining whether the detected input was a selection input at step 114.

Figure 6:
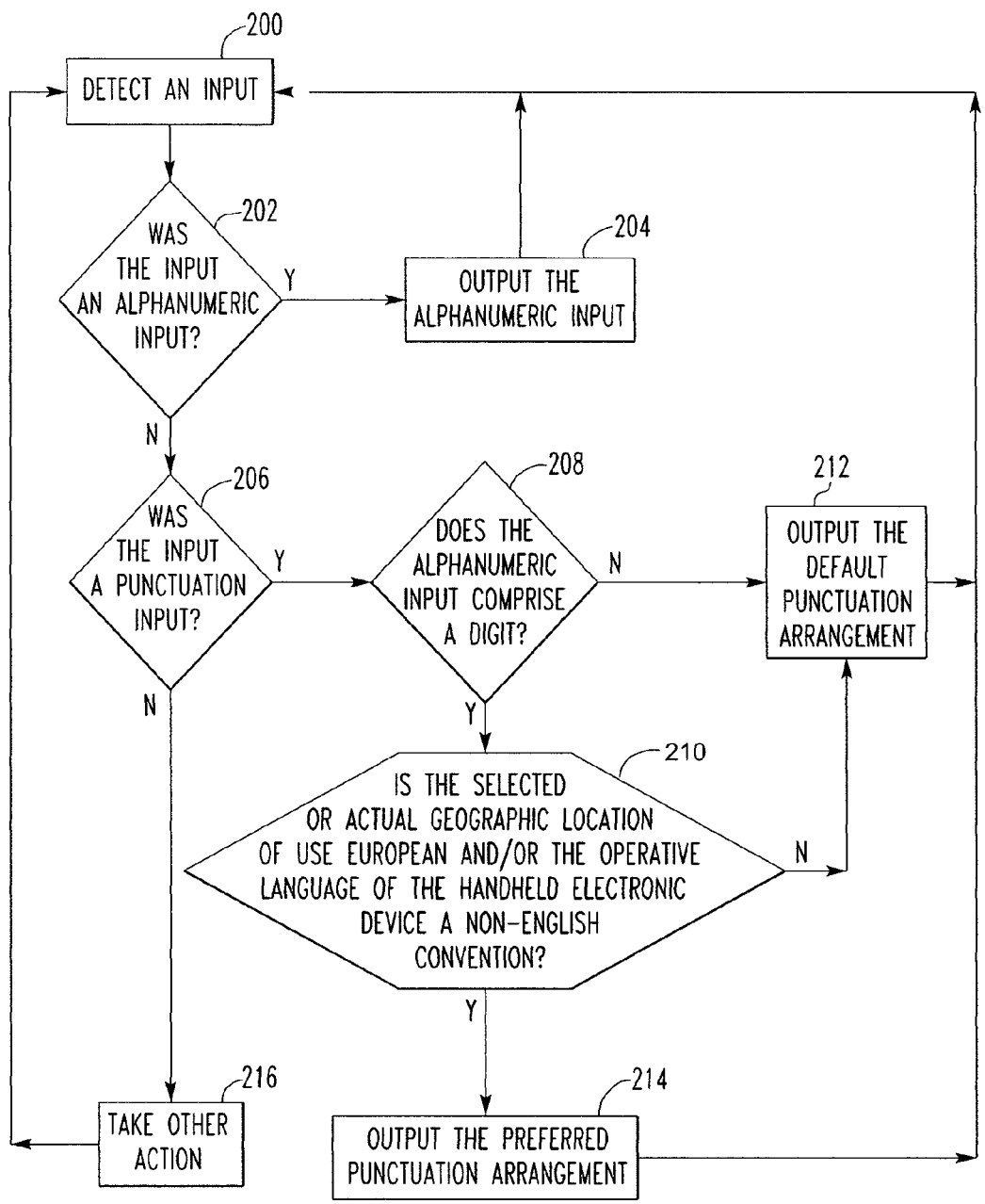
FIG. 6. is a flowchart depicting another embodiment of an improved method in accordance with the disclosed and claimed concept.

FIG. 6 is a flowchart depicting another embodiment of the disclosed concept. Steps 200, 202, 204, 206, 208, 212, and 216 correspond to steps 100, 102, 104, 106, 108, 112, and 114 in FIG. 5, respectively. Accordingly, the description of steps 100, 102, 104, 106, 108, 112, and 114 in the preceding paragraphs will also apply to their counterparts in FIG. 6. In this embodiment, the handheld electronic device 2 will determine whether the selected or actual geographic location of use is European and/or the operative language of the handheld electronic device 2 is a non-English convention at step 210. If the handheld electronic device 2 does determine that the selected or actual geographic location of use is European and/or the operative language of the handheld electronic device 2 is a non-English convention, then the handheld electronic device 2 will output the preferred punctuation arrangement, which is a comma followed by no space thereafter, at step 214.

Figure 7:
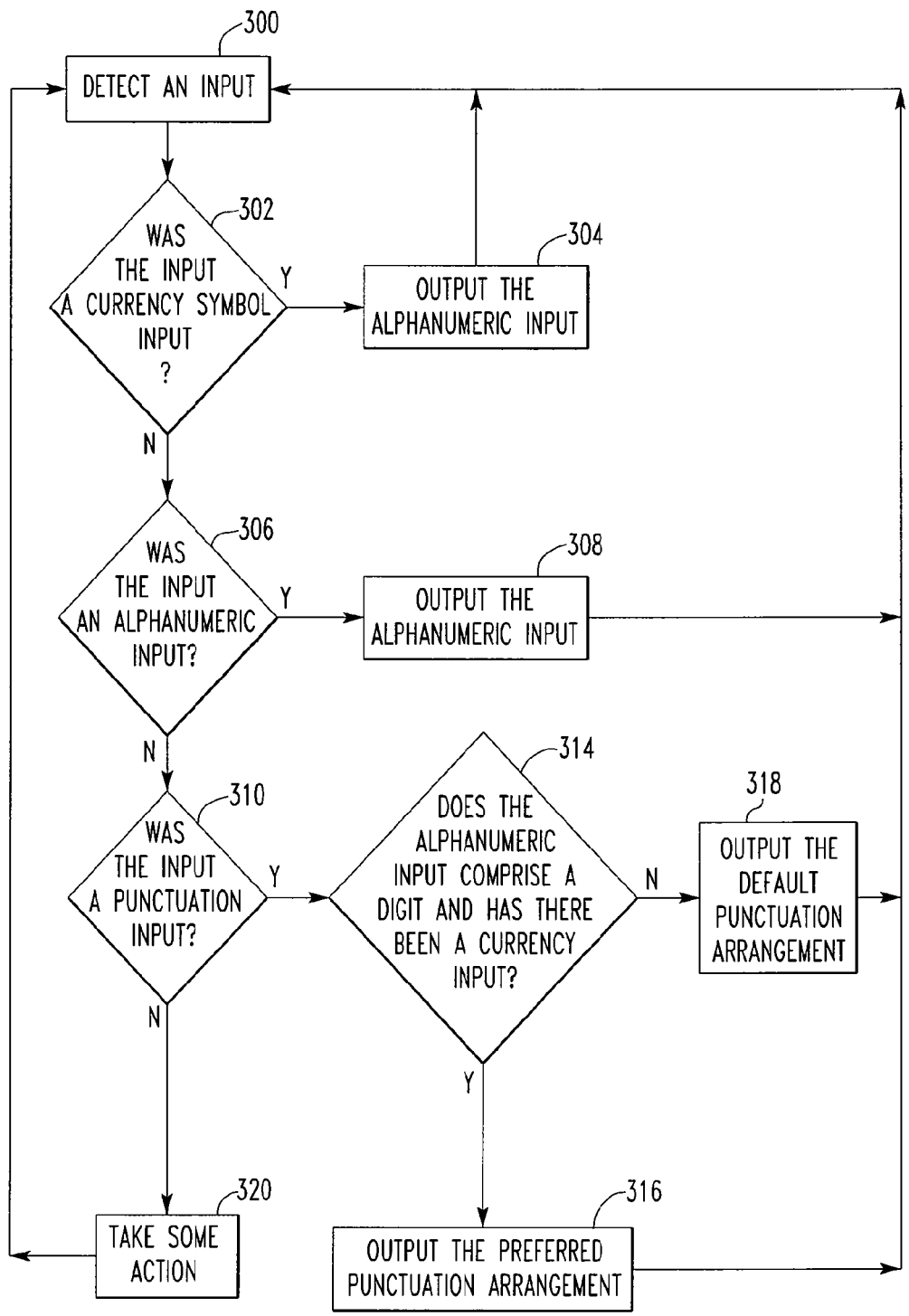
FIG. 7 is a flowchart depicting yet another embodiment of an improved method in accordance with the disclosed and claimed concept.

FIG. 7 is a flowchart depicting yet another embodiment of the disclosed concept. Steps 300, 306, 308, 310, 316, 318, and 320 correspond to steps 100, 102, 104, 106, 108, 112, and 114 of FIG. 5, respectively. Accordingly, the description of steps 100, 102, 104, 106, 108, 110, 112, and 114 will also apply to their counterparts in FIG. 7. In this particular embodiment, the handheld electronic device 2 will determine whether the detected input was a currency symbol input (initial input) at step 302. If the handheld electronic device 2 does determine that the detected input was a currency symbol input, then the handheld electronic device will output the currency symbol at step 304. Moreover, the handheld electronic device 2 will not only determine, at step 314, whether the alphanumeric input comprises a digit, but the handheld electronic device 2 will also determine whether a currency symbol has been input into the handheld electronic device 2. It should be noted that steps 302, 304, and 314 (with step 314 replacing step 208) can also be included in the embodiment that is depicted in FIG. 6 as well.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input on a handheld electronic device, said handheld electronic device including an input apparatus and an output apparatus, said input apparatus having a plurality of input members that are capable of being actuated, said method comprising:
   detecting as an alphanumeric input a first number of input member actuations;
   responsive to said detecting an alphanumeric input, generating a first output;
   detecting as a punctuation input a second number of input member actuations;
   making a determination that said first output comprises a digit;
   responsive to said determination that said first output comprises a digit, selecting as a preferred punctuation arrangement a predetermined punctuation arrangement from among a plurality of punctuation arrangements that correspond with said punctuation input;
   outputting said predetermined punctuation arrangement; and
   simultaneously outputting another punctuation arrangement as an alternative punctuation arrangement selectable by a user.

2. The method according to claim 1, further comprising identifying as said preferred punctuation arrangement a decimal symbol.

3. The method according to claim 2, further comprising outputting a period as the decimal symbol.

4. The method according to claim 1, further comprising detecting at least one of a selectable geographic location of use and an actual geographic location of use as being European and, responsive thereto, identifying as said preferred punctuation arrangement a comma.

5. The method according to claim 1, further comprising outputting as said another punctuation arrangement a period followed by at least a first space.

6. The method according to claim 1, further comprising:
   prior to detecting said alphanumeric input, detecting as an initial input an actuation of a number of input members;
   responsive to said detecting an initial input, generating an initial output; and
   making as a portion of said determination, a determination that said initial output comprises a currency symbol.

7. The method according to claim 1, further comprising:
   detecting an operative language on said handheld electronic device; and
   making another determination that said operative language is a non-English convention.

8. The method according to claim 7, further comprising responsive to said making another determination, identifying as said preferred punctuation arrangement a comma.

9. The method according to claim 8, further comprising making as said another determination a determination that said operative language is Spanish.

10. The method according to claim 8, further comprising outputting a period as the alternative punctuation arrangement selectable by a user.

11. A handheld electronic device, comprising:
    a keyboard having a plurality of input members;
    a display;
    a processor apparatus comprising a processor and a memory in electronic communication with one another, said processor apparatus having stored therein a number of routines which, when executed on the processor, cause the handheld electronic device to perform operations comprising:
    detecting as an alphanumeric input a first number of input member actuations;
    responsive to said detecting an alphanumeric input, generating a first output;
    detecting as a punctuation input a second number of second input member actuations;
    making a determination that said first output comprises a digit;
    responsive to said determination that said first output comprises a digit, selecting as a preferred punctuation arrangement a predetermined punctuation arrangement from among a plurality of punctuation arrangements that correspond with said punctuation input;
    outputting said predetermined punctuation arrangement; and
    simultaneously outputting another punctuation arrangement as an alternative punctuation arrangement selectable by a user.

12. The handheld electronic device according to claim 11, wherein said preferred punctuation arrangement is a decimal symbol.

13. The handheld electronic device according to claim 11, wherein said preferred punctuation arrangement is a period.

14. The handheld electronic device according to claim 11, wherein said number of routines cause the handheld electronic device to perform operations further comprising detecting at least one of a selectable geographic location of use and an actual geographic location of use as being European and, responsive thereto, identifying as said preferred punctuation a comma.

15. The handheld electronic device according to claim 11, wherein said another punctuation arrangement comprises a period followed by at least a first space.

16. The handheld electronic device according to claim 11, wherein said number of routines causes the handheld electronic device to perform operations further comprising:
    prior to detecting said alphanumeric input, detecting as an initial input an actuation of a number of input members;
    responsive to said detecting as an initial input, generating an initial output; and
    making as a portion of said determination, a determination that said initial output comprises a currency symbol.

17. The handheld electronic device according to claim 11, wherein said number of routines causes the handheld electronic device to perform operations further comprising:
    detecting an operative language on said handheld electronic device; and
    making another determination that said operative language is a non-English convention.

18. The handheld electronic device according to claim 17, wherein said preferred punctuation arrangement is a comma.

19. The handheld electronic device according to claim 18, wherein said operative language is Spanish.

* * * * *